United States Patent
Jessberger et al.

(10) Patent No.: US 8,518,139 B2
(45) Date of Patent: Aug. 27, 2013

(54) FILTER DEVICE FOR FILTERING GASEOUS FLUIDS

(75) Inventors: Thomas Jessberger, Asperg (DE);
Arthur Sudermann, Ditzingen (DE);
Michael Metzger, Waiblingen (DE)

(73) Assignee: Mann + Hummel GmbH, Ludwigsburg (DE)

( * ) Notice: Subject to any disclaimer, the term of this patent is extended or adjusted under 35 U.S.C. 154(b) by 67 days.

(21) Appl. No.: 13/201,494

(22) PCT Filed: Feb. 5, 2010

(86) PCT No.: PCT/EP2010/051392
§ 371 (c)(1),
(2), (4) Date: Sep. 7, 2011

(87) PCT Pub. No.: WO2010/092003
PCT Pub. Date: Aug. 19, 2010

(65) Prior Publication Data
US 2011/0308214 A1 Dec. 22, 2011

(30) Foreign Application Priority Data
Feb. 16, 2009 (DE) .......................... 10 2009 009 066

(51) Int. Cl.
*B01D 46/00* (2006.01)
(52) U.S. Cl.
USPC .................... 55/495; 55/497; 55/502; 55/503
(58) Field of Classification Search
USPC ............... 55/385.3, 497, 500, 502, 503, 498, 55/509, 490, 511, 521; 123/198 E; 210/493.1, 210/493.5
See application file for complete search history.

(56) References Cited

U.S. PATENT DOCUMENTS

| | | | | |
|---|---|---|---|---|
| 5,605,554 A * | 2/1997 | Kennedy | ......................... | 55/493 |
| 5,640,937 A | 6/1997 | Slopsema | | |
| 6,293,984 B1 * | 9/2001 | Oda et al. | ......................... | 55/497 |
| 6,508,851 B2 * | 1/2003 | Goerg | ......................... | 55/385.3 |
| 7,300,486 B1 * | 11/2007 | Kirsch | ............. | 55/502 |
| 7,879,124 B2 * | 2/2011 | Uemura et al. | ................. | 55/506 |
| 2006/0080949 A1 * | 4/2006 | Moriyama et al. | .............. | 55/490 |
| 2007/0125052 A1 * | 6/2007 | Holzmann et al. | .............. | 55/502 |

FOREIGN PATENT DOCUMENTS

| | | |
|---|---|---|
| DE | 196 34 720 A1 | 3/1998 |
| DE | 196 38 660 A1 | 3/1998 |
| DE | 100 20 538 A1 | 10/2001 |
| DE | 20 2006 001 440 U1 | 6/2007 |
| EP | 0 982 062 A2 | 3/2000 |

OTHER PUBLICATIONS

PCT International Search report for PCT/EP2010/051392.
DPMA Office Action for DE 10 2009 009 066.5.

* cited by examiner

*Primary Examiner* — Duane Smith
*Assistant Examiner* — Minh-Chau Pham
(74) *Attorney, Agent, or Firm* — James Hasselbeck

(57) ABSTRACT

The invention relates to a filter device for filtering gaseous fluids that is provided with a filter insert part that includes a filter medium and a sealing element, wherein the filter insert part is to be inserted into a filter housing. Furthermore, an additional sealing web is provided between the sealing body of the sealing element and the housing part, wherein the sealing element has a common contact surface with the sealing web, wherein the sealing web is offset in the direction of the clean side of the filter medium with respect to the contact surface.

15 Claims, 2 Drawing Sheets

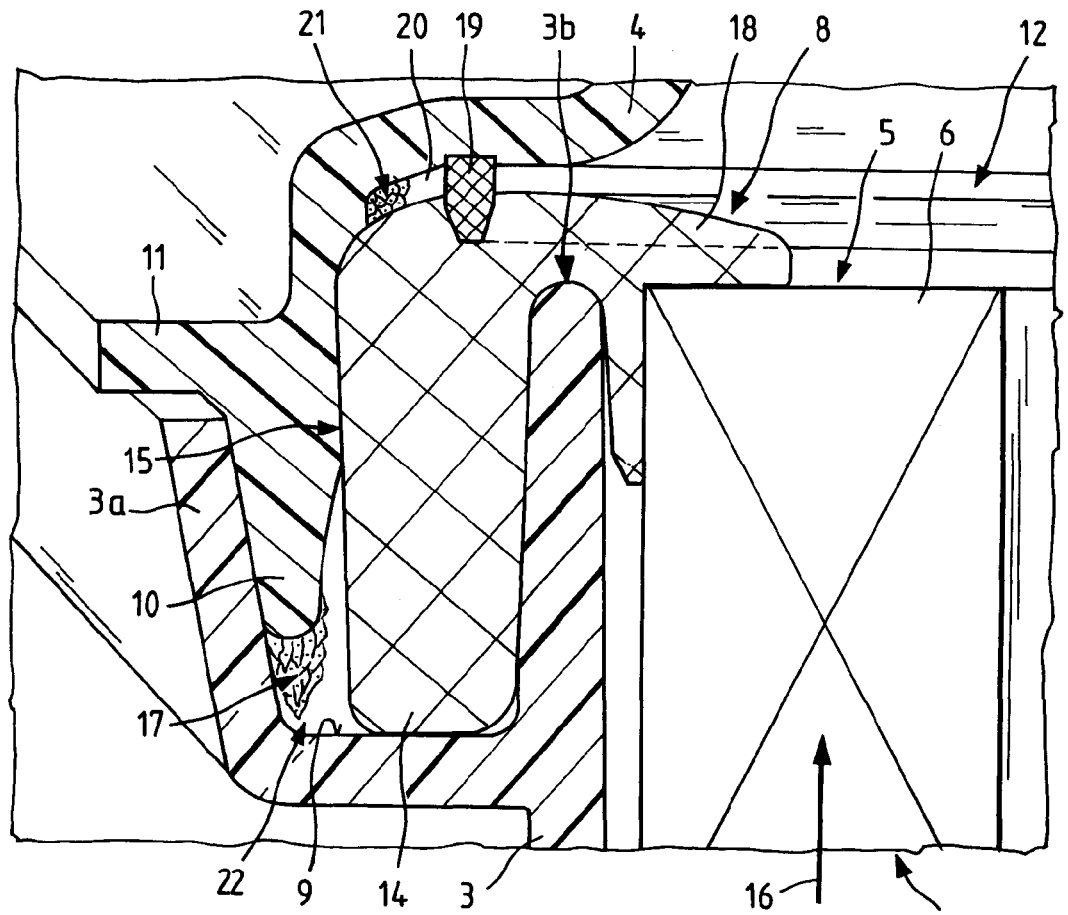
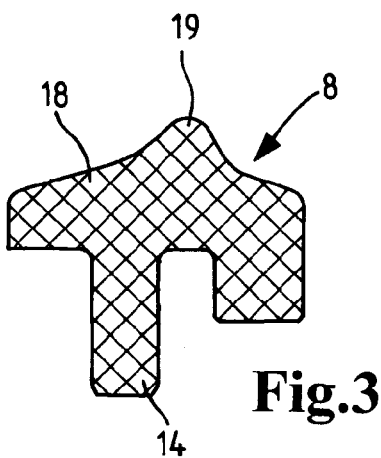
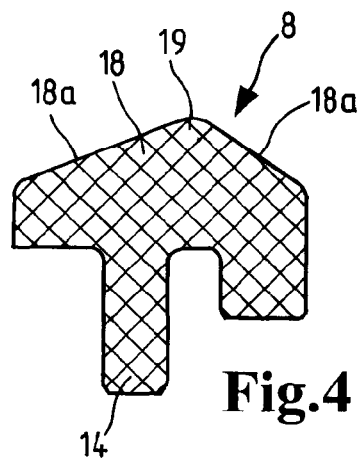

FILTER DEVICE FOR FILTERING GASEOUS FLUIDS

CROSS REFERENCE TO RELATED APPLICATIONS

This application is US National Stage Entry of international patent application no. PCT/EP2010/051392, filed Feb. 5, 2010 designating the United States of America, the entire disclosure of which is incorporated herein by reference. Priority is claimed based on Federal Republic of Germany patent application no. 10 2009 009 066.5, filed Feb. 16, 2009.

TECHNICAL FIELD

The invention concerns a filter device for filtering gaseous fluids, in particular an air filter in a motor vehicle.

PRIOR ART

An air filter with a filter insert that is insertable into a filter housing is disclosed in EP 0 863 785 B1. The filter insert is comprised of a zigzag-shaped folded filter medium that is flowed through by the air to be purified and a filter frame that frames the filter medium and on which sealing pockets are formed into which a silicone foam seal is cast. The silicone foam seal projects past an end face of the filter medium so that in the mounted state an axial force loading of the silicone foam seal in the area of the projecting end face exists.

The filter insert is embodied as an exchangeable component and for maintenance purposes can be removed from the filter housing and subsequently, after cleaning or an exchange of the filter medium, can be reinserted. In this connection, care must be taken that, if possible, no dirt particles reach the area of the clean side of the filter element that after reinsertion are transported farther within the airflow without filtration. In case of an air filter in the intake manifold of an internal combustion engine, there is the risk that these dirt particles can reach directly the cylinder of the internal combustion engine.

The invention has the object to provide with simple constructive measures a filter device for filtration of gaseous fluids in a pressure-tight way wherein in case of a filter exchange the risk of undesirable contaminations is to be reduced.

SUMMARY OF THE INVENTION

The filter device according to the invention serves preferably for filtration of combustion air in the intake manifold of internal combustion engines wherein in principle also utilization in other systems for air or gas purification are conceivable, for example, for cleaning the air that is to be supplied to the passenger compartment of a vehicle.

The filter device comprises a filter insert part which is provided with a filter medium and a sealing element secured on the filter medium as well as a filter housing into which the filter insert part is inserted and, for exchange or maintenance of the filter medium, can be removed again. In the inserted state the sealing element and the housing part of the filter housing have a common contact surface on which a sealing force is acting in order to separate fluid-tightly the raw side from the clean side of the filter element or the filter medium or the clean side of the filter medium from the surroundings. In the mounted state it is moreover ensured at the same time that dirt particles cannot pass from the raw side to the clean side or from the exterior to the clean side.

In order to prevent, in particular in case of an exchange or maintenance of the filter insert part, that dirt particles accidentally will reach the area of the clean side of the filter medium and after reinsertion of the filter insert part into the housing are immediately transported within the airflow without being subjected to a cleaning process, according to the invention an additional sealing web is provided between the sealing body of the sealing element and the housing part. The sealing web is positioned at a spacing relative to the contact location between the sealing element and the housing part and, relative to this contact location, is arranged so as to be displaced in the direction of the clean side of the filter medium. The sealing web provides an additional contact location between the housing part and the sealing element wherein on the basis of positioning of the sealing web in the direction toward the clean side of the filter medium an additional safety measure relative to accidental soiling of the clean side of the filter element during exchange of the filter insert part is provided.

The sealing web is preferably positioned at a spacing from the contact surface between housing part and sealing body of the sealing element wherein in the intermediate area between the contact surface and the sealing web expediently a dirt receptacle is formed that provides a receiving volume for dirt particles. A further propagation in the direction of the clean side of the filter medium is effectively prevented by this sealing web. At the same time, this area provides an additional reservoir in which dirt particles can be received in case the latter, upon insertion of the filter insert part into the housing, accidentally remain adhered on one of the components of the filter device and together with the filter insert part or a housing part are transported into the housing interior. The dirt receptacle particularly is present also in the inserted state of the filter insert part, despite partial compression of the sealing body of the sealing element. Where appropriate, it is however sufficient that under the effect of the sealing force also the volume of the dirt receptacle is reduced, if appropriate to zero, wherein in this case the dirt particles in the receptacle are forced against the surface of the sealing body of the sealing element.

In case that no additional dirt receptacle is provided, the sealing web marks the boundary of the contact surface in the direction of the clean side of the filter medium. Additional dirt particles are jammed in this case immediately in the area of the contact surface between the inner side of the housing and the sealing body of the sealing element. Since distributed about the sealing web across a relatively small surface area a high pressure force is transmitted, an additional seal-tightness and increased safety toward the clean side of the filter medium is provided.

In case of a dirt receptacle between the inner side of the housing and the sealing element, the dirt receptacle is expediently of an angular shape, wherein the outer surface of the sealing element in the area of the contact surface are oriented toward the inner side of the housing and in the area of the dirt receptacle are oriented at an angle relative to each other, for example, are positioned relative to each other at a 90 E angle. In this connection, it is expedient that the contact surface is oriented parallel to the flow direction through the filter medium and the dirt receptacle is delimited by the outer side of the sealing element that is positioned at a 90 E angle thereto and is thus perpendicular to the flow direction through the filter medium.

The sealing web is in particular embodied as a circumferentially extending component that surrounds the filter medium and separates on all sides the raw side from the clean side.

Various embodiments for the sealing web are conceivable. For example, it is possible that the sealing web is formed monolithically with the housing part in that the sealing web forms a circumferentially extending projection that is formed on the inner side of the corresponding housing part that, in the mounted state, is in contact with the sealing element. Possible is also a monolithic configuration together with the sealing element, for example, such that the sealing web is formed on the sealing body and projects past the plane of the sealing body or as a monolithic embodiment with the sealing body that is of an angled configuration wherein the sealing web forms the angled edge of the sealing body. Finally, also an embodiment of the sealing web as a separate component is conceivable that, however, is preferably connected for reasons related to assembly with one of participating sealing partners, in particular with the housing component with which the sealing web is connected by suitable attachment measures, for example, by an adhesive connection or by mechanical fastening means.

BRIEF DESCRIPTION OF THE DRAWINGS

Further advantages and expedient embodiments can be taken from the further claims, the figure description, and the drawings. It is shown in:

FIG. 2 a section view of the filter device with inserted filter insert part in the area of a sealing element at the rim;

FIG. 3 the sealing element in an alternative embodiment;

FIG. 4 the sealing element in yet another embodiment.

In the figures same components are identified with same reference characters.

EMBODIMENT(S) OF THE INVENTION

Figure 1:
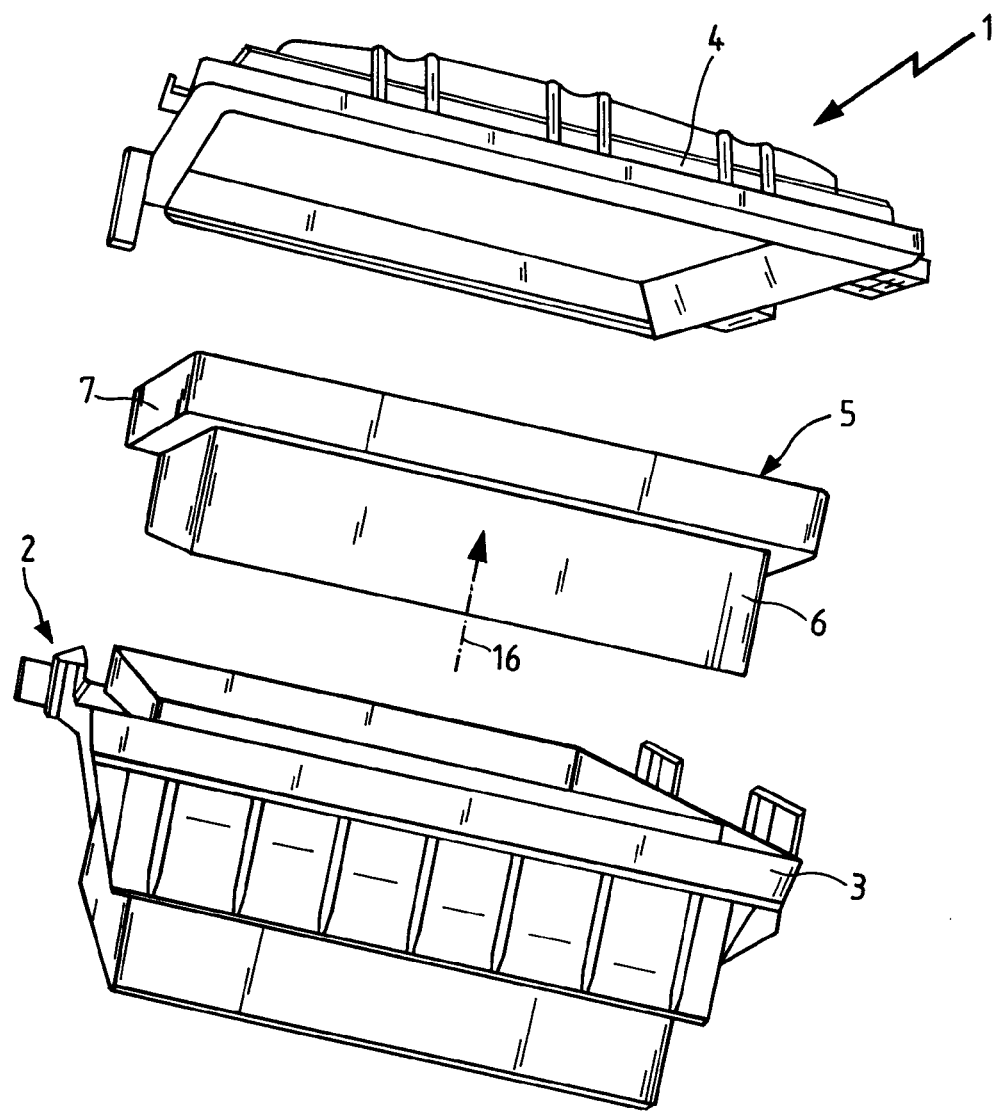
FIG. 1 an exploded view of an air filter with a housing bottom part, a filter insert part, and a housing cover.

In FIG. 1 a filter device 1 is illustrated that is usable as an air filter in the intake manifold of internal combustion engines. The filter device 1 comprises a filter housing 2 with a housing bottom part 3 and a housing top part 4 that is functioning as a housing cover. Into the filter housing 2 a filter insert part 5 is insertable that comprises a filter element or filter medium 6 that, for example, is embodied as a filter paper folded in a zigzag shape and is flowed through in the flow direction 16 by the air to be cleaned. The filter medium 6 in the filter insert part 5 is framed by a filter frame 7 that is the support for a circumferentially extending sealing element for separation of the raw side from the clean side of the filter medium 6. Optionally, the sealing element is also integrally injection-molded immediately onto the rim area of the filter element or is connected in other ways directly with the rim of the filter medium. The filter medium 6 is flowed through in axial direction, i.e., perpendicular to the plane of the filter frame 7, by the gaseous fluid to be cleaned.

In FIG. 2 the sealing element 8 is illustrated that is connected to the filter medium 6 and separates the clean side 12 at the top from the raw side 13 positioned at the bottom of the filter medium 6. Moreover, the sealing element 8 shields the clean side 12 from the surroundings. In the mounted state illustrated in FIG. 2, a downwardly oriented sealing leg 14 projects into a housing pocket 9 that is formed on the topside of the housing bottom part 3 and is embodied to be open in the direction of the housing cover 4. Moreover, a housing projection 10 projects also into the housing pocket 9 that is formed on the bottom side of the housing cover 4 and extends downwardly. A housing leg 11 on the housing cover 4 projects angularly away from the housing projection 10 radially in outward direction and is resting against a free end face of a wall 3a of the housing part that is delimiting the housing pocket 9.

The housing projection 10 on the cover 4 is resting immediately on the facing outer side of the sealing leg 14 wherein the contacting surfaces of projection 10 and leg 14 form a common contact surface 15 where the participating components contact each other with a sealing force oriented transversely to the flow direction 16. Immediately located at the free end face of the housing projection 10 there is a free space 22 that extends to the base of the housing pocket 9; this free space could serve for receiving dirt particles 17. This free space 22 can, where appropriate, be formed also between the free end face of the sealing leg 14 and the base of the housing pocket 9.

The vertical sealing leg 14 that is parallel to the flow direction 16 is formed monolithically together with a horizontal sealing leg 18 that is positioned at the top part and extends transversely to the flow direction, by means of which the sealing element 8 is connected with the filter medium 6 in the area of the clean side 12. The horizontal leg 18 engages across the upper terminal edge 3b of the housing wall of the housing bottom part 3.

The upper outer side of the horizontal sealing leg 18 is engaged by a sealing web 19 that is also embodied to extend circumferentially in order to achieve about the entire circumference of the filter medium 6 an additional sealing action of the clean side 12 relative to the raw side 13 or the surroundings. The sealing web 19 in the embodiment is formed as a separate component but is expediently connected to the housing cover 4, particularly to the inner side of the housing cover that is facing the interior. The sealing web 19 has a pointed end face with which the sealing web 19 of the sealing element 8 contacts the area of the horizontal leg 18. The sealing web 19 forms an additional sealing location that relative to the contact surface 15 between the housing projection 10 and the vertical sealing leg 14 is displaced in the direction toward the clean side 12.

The sealing web 19 delimits a dirt receptacle 20 between the outer side of the horizontal sealing leg 18 and the inner side of the housing cover 4. This dirt receptacle 20 is located between the contact surface 15 and the sealing web 19. The sealing web 19 ensures that these dirt particles 21 cannot accidentally reach the area of the clean side 12 of the filter medium 6.

The dirt receptacle 20 is present even in the inserted state of the filter medium 6 and the attached housing cover 4 despite the sealing forces between the housing cover and the sealing element. The sealing web 19 as a result of its pointed end face can dig into the sealing material of the horizontal sealing leg 18.

As an alternative to the embodiment illustrated in FIG. 2 of the sealing web 19 it is also possible to configure the sealing web as a monolithic part together with the housing cover 4.

In the embodiment according to FIG. 3 the sealing web 19 is monolithically embodied with the sealing element 8. The sealing web 19 is embodied as a projection that projects past the horizontal leg 18 of the sealing element 8 that forms a sealing body that in the mounted state is contacting the inner side of the housing cover 4 and delimits the dirt receptacle relative to the clean side.

In the embodiment according to FIG. 4 the sealing web 19 is also monolithically formed together with the sealing element 8. The horizontal leg 18 of the sealing element 8 has in cross-section an angled configuration wherein the sealing web 19 forms the angled edge between the angle surfaces 18a of the leg 18.

The invention claimed is:

1. An filter device for filtration of gaseous fluids, comprising:
   a filter housing including
      a first housing part;
      a second housing part,
      wherein said first and second housing parts are detachably mounted together defining a filter receptacle chamber therein;
   a filter insert part removeably inserted into and enclosed within said filter receptacle chamber of said filter housing, said filter insert part including
      a filter medium including
         a clean side; and
         a dirty side,
         wherein gaseous fluid flow through said filter medium from said dirty side to said clean side in a flow direction;
      a sealing element arranged on and connected to said filter medium, said sealing element including:
         a horizontal leg having a first end connected to said first filter medium and extending radially outwardly from said filter medium in a traverse direction relative to said flow direction to a sealing leg;
         said sealing leg arranged at and having a first end connected to an said horizontal leg and extending in said flow direction away from said horizontal leg to an opposing end;
   wherein said second housing part has a U-shaped pocket opening towards said first housing part, said U-shaped pocket including:
      a bottom wall;
      an outer wall extending from said bottom wall of said U-shaped pocket towards said open end and terminating at a free end face proximate to said first housing part;
      an inner wall extending from a said bottom wall of said U-shaped pocket towards said open end and terminating at an upper terminal edge;
   wherein said sealing leg projects into said U-shaped pocket,
   wherein said first housing part includes a housing projection that projects into said U-shaped pocket,
   wherein said housing projection rests immediately on an a facing outer side surface of said sealing leg forming a common contact surface where said housing projection and said sealing leg contact,
   wherein said first housing part includes a housing leg projecting outwardly away from the housing projection, said housing leg resting against said free end face,
   wherein in the inserted state both said sealing element and said first housing part sealably abut against each other and seal along said common contact surface,
   a sealing web arranged between said sealing element and said first housing part, said sealing web including
      a first end abutting and sealing against an interior surface of said first housing part;
      an opposing second end abutting and sealing against said sealing element;
   wherein relative to said flow direction, said common contact surface is positioned nearer to said clean side of said filter medium than to said dirty side of said filter medium.

2. The filter device according to claim 1, wherein said sealing web is spaced radially inwardly away from said common contact surface, said sealing web arranged between said sealing element and said interior surface of said first housing part.

3. The filter device according to claim 1, wherein a dirt receptacle space is formed between said sealing element and said first housing part in a position between said common contact surface and said sealing web, said dirt receptacle delimited by said first housing part and said sealing element.

4. The filter device according to claim 3, wherein said common contact surface of said sealing element and an outer surface of said sealing element are positioned angularly or at a slant relative to each other.

5. The filter device according to claim 1, wherein said sealing web is a separate component from and not unitary with said sealing element.

6. The filter device according to claim 5, wherein said sealing web is a separate component from and not unitary with said filter housing.

7. The filter device according to claim 5, wherein said sealing web is formed monolithically together with and is unitary with said first housing part.

8. The filter device according to claim 5, wherein said sealing web is elastically deformed in the inserted state of the filter insert part by compression between sand interior surface of said first housing part and said sealing element.

9. The filter device according to claim 1, wherein said sealing web is embodied monolithically together with said sealing element and a unitary component.

10. The filter device according to claim 9, wherein said sealing web projects outwardly in said flow direction from said sealing element.

11. The filter device according to claim 9, wherein said sealing web is embodied monolithically together with said sealing element as a unitary component,
wherein said sealing web is a tip portion formed on a horizontal leg of said sealing element, said tip portion at an outwardly most positioned of said sealing element relative to said flow direction, said outwardly most position is said flow direction relative to said clean side of said filter insert,
wherein said horizontal leg includes a first sloped surface extending from a radially inward edge of said sealing element to meet said tip portion,
wherein said horizontal leg includes a second sloped surface extending from said top portion to a radially outward edge of said sealing element,
wherein said first and second sloped surfaces are sloped at different angles.

12. The filter device according to claim 1, wherein a sealing force is generated at said common contact surface between said sealing element and said first housing part,
wherein said sealing force is oriented transversely to said flow direction.

13. The filter device according to claim 1, wherein a clamping force is generated between said first housing part and said sealing element through said sealing web,
wherein said clamping force is oriented parallel to said flow direction.

14. The filter device according to claim 1, wherein said sealing element includes a sealing leg extending in a direction opposite to said flow direction,
wherein said second housing part has a U-shaped pocket opening towards said first housing part, wherein said sealing leg projects into said U-shaped pocket.

15. The filter device according to claim 14, wherein
said sealing web is spaced radially inwardly away from said common contact surface, said sealing web arranged between said sealing element and said interior surface of said first housing part, wherein a dirt receptacle space is formed between said sealing element and said first housing part in a position between said common contact surface and said sealing web, said dirt receptacle delimited by said first housing part and said sealing element, wherein sealing element is connected at a first end to said clean side of said filter medium, wherein said sealing element includes a horizontal leg extending in a direction traverse to said flow direction, said horizontal leg having a first end connected to said clean side of said filter medium, said horizontal leg having an opposing second end positioned radially outwardly away from first end, wherein said common contact surface of said sealing element is arranged on said second end of said sealing element;

wherein a sealing force is generated at said common contact surface between said sealing element and said first housing part, wherein said sealing force is oriented transversely to said flow direction, wherein a clamping force is generated between said first housing part and said sealing element through said sealing web, wherein said clamping force is oriented parallel to said flow direction.

* * * * *